(12) United States Patent
Moride et al.

(10) Patent No.: US 11,247,258 B2
(45) Date of Patent: Feb. 15, 2022

(54) METHOD FOR MANUFACTURING SEPARATOR

(71) Applicant: TOYOTA JIDOSHA KABUSHIKI KAISHA, Toyota (JP)

(72) Inventors: Kenshiro Moride, Nagoya (JP); Takayuki Furuhata, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 414 days.

(21) Appl. No.: 16/253,559

(22) Filed: Jan. 22, 2019

(65) Prior Publication Data

US 2019/0270130 A1 Sep. 5, 2019

(30) Foreign Application Priority Data

Mar. 2, 2018 (JP) .............................. JP2018-037867

(51) Int. Cl.
*B21D 35/00* (2006.01)
*B21D 53/00* (2006.01)
*B21D 28/32* (2006.01)
*B21D 28/24* (2006.01)
(Continued)

(52) U.S. Cl.
CPC ........... *B21D 35/001* (2013.01); *B21D 22/02* (2013.01); *B21D 28/243* (2013.01); *B21D 28/32* (2013.01); *B21D 53/00* (2013.01); *H01M 8/0258* (2013.01)

(58) Field of Classification Search
CPC .... B21D 35/001; B21D 35/002; B21D 22/02; B21D 22/027; B21D 28/24; B21D 28/26; B21D 28/243; B21D 28/32; B21D 53/00; B21D 13/02; B21D 13/10; B21D 53/02; B21D 28/265; B21D 53/04; B21D 28/246; B21D 22/24; B21D 22/26; B21D 24/005; B21D 5/06; B21D 13/06; B21D 13/08;
(Continued)

(56) References Cited

U.S. PATENT DOCUMENTS

2005/0188740 A1   9/2005  Enjoji et al.
2009/0081520 A1*  3/2009  Seido .................. H01M 8/0254
                                                            429/457
(Continued)

FOREIGN PATENT DOCUMENTS

CN   102082282 A   6/2011
CN   102365158 A   2/2012
(Continued)

OTHER PUBLICATIONS

Hiromi Yoshida et al., "100 Examples of Stamping Technology", Mar. 1978, pp. 169-170.

*Primary Examiner* — Teresa M Ekiert
*Assistant Examiner* — Sarkis A Aktavoukian
(74) *Attorney, Agent, or Firm* — Oliff PLC (57) ABSTRACT

A method for manufacturing a separator that can effectively prevent warpage is provided. A method for manufacturing a separator according to an embodiment includes disposing a separator material including a flow path forming region between a first upper die and a first lower die, and pressing the separator material using the first upper die and the first lower die to thereby form a first recessed and projected shape in the flow path forming region and form a second recessed and projected shape outside the flow path forming region.

5 Claims, 10 Drawing Sheets

(51) Int. Cl.
*B21D 22/02* (2006.01)
*H01M 8/0258* (2016.01)

(58) Field of Classification Search
CPC .. H01M 8/0258; H01M 8/0247; H01M 8/026; H01M 8/0254
USPC ..................................................... 29/890.08
See application file for complete search history.

(56) References Cited

U.S. PATENT DOCUMENTS

| | | | |
|---|---|---|---|
| 2009/0263702 A1* | 10/2009 | Vyas | H01M 8/026 |
| | | | 429/480 |
| 2011/0123904 A1* | 5/2011 | Fujimura | H01M 8/026 |
| | | | 429/512 |
| 2011/0207018 A1* | 8/2011 | Nakagawa | H01M 8/0267 |
| | | | 429/483 |
| 2012/0025420 A1 | 2/2012 | Utashiro et al. | |
| 2015/0266078 A1 | 9/2015 | Hirata | |
| 2016/0074919 A1* | 3/2016 | Taguchi | H01M 8/0258 |
| | | | 72/352 |
| 2016/0248104 A1* | 8/2016 | Konno | H01M 8/2483 |

FOREIGN PATENT DOCUMENTS

| | | |
|---|---|---|
| JP | 2003-338295 A | 11/2003 |
| JP | 2005-1 66463 A | 6/2005 |
| JP | 2006-075900 A | 3/2006 |
| JP | 2009-283251 A | 12/2009 |
| JP | 2012-99371 A | 5/2012 |

\* cited by examiner

FIRST PRESS WORKING STEP
(DRAWING STEP)

SECOND PRESS WORKING STEP
(CRUSHING STEP)

PUNCHING STEP

METHOD FOR MANUFACTURING SEPARATOR

CROSS REFERENCE TO RELATED APPLICATIONS

This application is based upon and claims the benefit of priority from Japanese patent application No. 2018-37867, filed on Mar. 2, 2018, the disclosure of which is incorporated herein in its entirety by reference.

BACKGROUND

The present disclosure relates to a method for manufacturing a separator.

Japanese Unexamined Patent Application Publication No. 2012-99371 discloses an apparatus and a method for manufacturing a separator for a fuel cell. The manufacturing apparatus of Japanese Unexamined Patent Application Publication No. 2012-99371 includes press molding means for pressing a flat metal plate disposed between an upper die and a lower die to form recesses and projections and a punching-out process means for punching out the metal plate into a die of a separator. The surface roughness of a lower die is larger than the surface roughness of the upper die.

SUMMARY

When a thin plate as a separator material is molded by press working, warpage may occur in the separator material in some cases. The warpage which occurs in the separator due to distortion at the time of molding may cause an excess material to be generated when the separator is bonded. Alternatively, the warpage may cause an assembly failure at the time of stacking the separator and a failure in workpiece transportation. It is thus desired to effectively prevent warpage during press working.

A method for manufacturing a separator according to an embodiment includes: disposing a separator material including a flow path forming region between a first upper die and a first lower die; and pressing the separator material using the first upper die and the first lower die to thereby form a first recessed and projected shape in the flow path forming region and form a second recessed and projected shape outside the flow path forming region.

The above method may further include crushing the second recessed and projected shape.

The above method may further include punching out a region where the second recessed and projected shape is formed. The second recessed and projected shape may be formed in a manifold part of the separator.

In the above method, a recessed and projected height of the second recessed and projected shape is preferably higher than a recessed and projected height of the first recessed and projected shape.

In the above method, recesses and projections of the second recessed and projected shape may be repeated along a direction inclined from a longitudinal direction of the separator material in a plan view.

According to the embodiment, it is possible to provide a method for manufacturing a separator that can effectively prevent warpage during press working.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, specific embodiments to which the present disclosure is applied will be described in detail with reference to the drawings. However, the present disclosure is not limited to the following embodiments. Further, the following descriptions and drawings are simplified as appropriate in order to clarify the descriptions.

Figure 1:
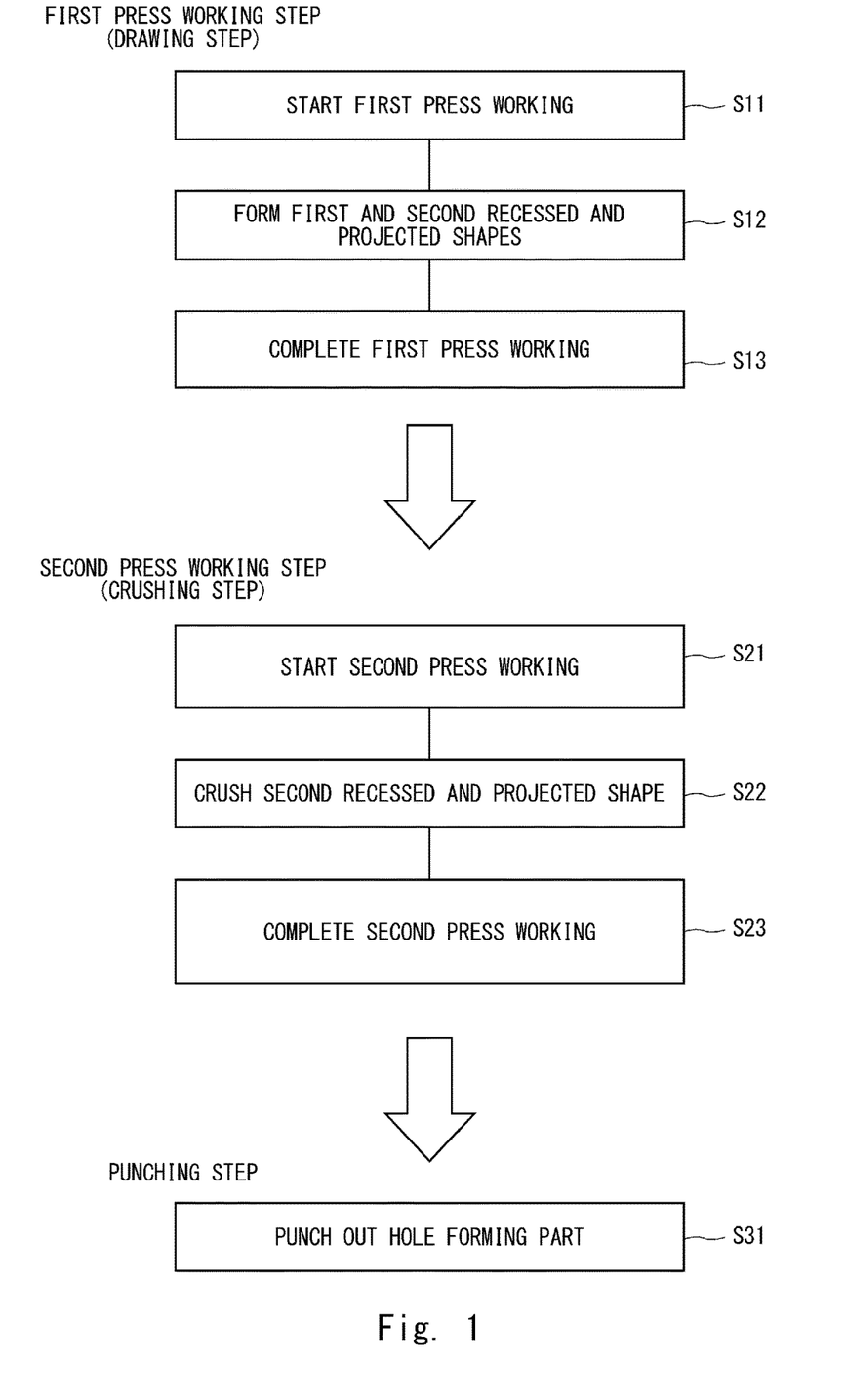
FIG. 1 is a view showing steps of manufacturing a separator.

A method for manufacturing a separator according to this embodiment will be described with reference to the drawings. FIG. 1 is a flowchart showing a method for manufacturing a separator. As shown in FIG. 1, in this embodiment, a separator is manufactured by performing a first press working step (a drawing step), a second press working step (a crushing step), and a punching step in this order.

Figure 2:
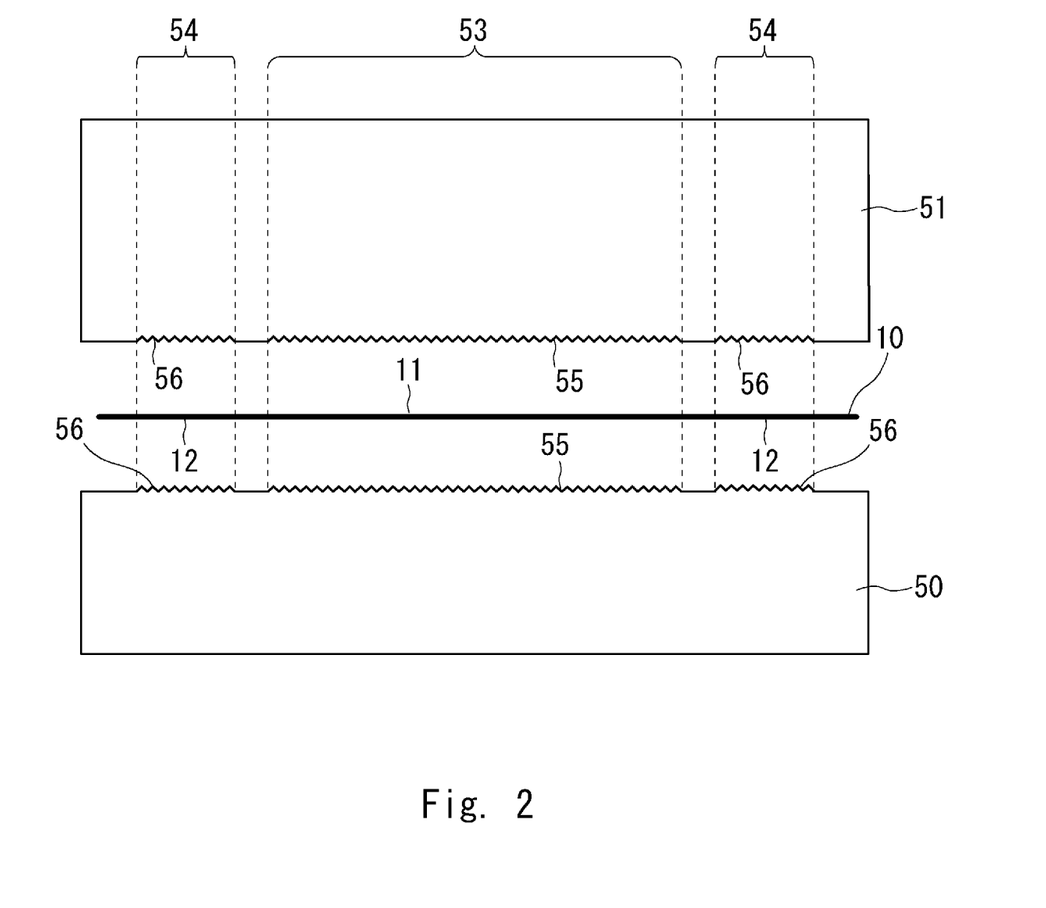
FIG. 2 is a cross-sectional view for describing a first press working step.

First, the first press working is started (S11). As shown in FIG. 2, a separator material 10 is disposed between a first upper die 51 and a first lower die 50. FIG. 2 is a side cross-sectional view schematically showing a configuration of a die for pressing the separator material 10. The separator material 10 is a metal plate having a thickness of about 0.1 mm. A conductive flat plate such as aluminum, stainless steel, titanium can be used as the separator material 10. The first upper die 51 and the first lower die 50 are dies on which recesses and projections according to a shape to be molded are formed.

Figure 3:
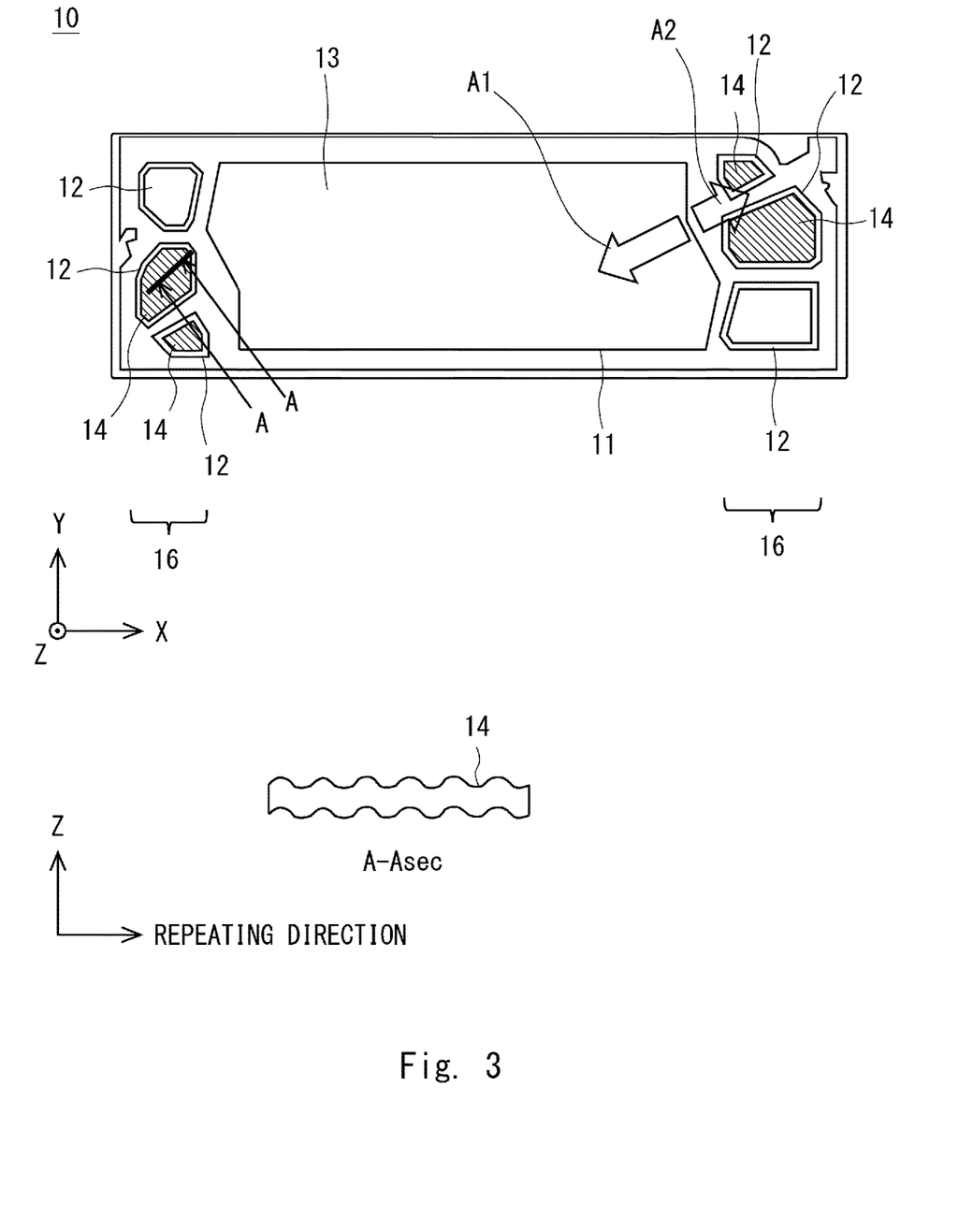
FIG. 3 is a view showing a configuration of a separator material in the first press working step.

FIG. 3 is a plan view schematically showing a shape of the separator material 10 and schematically showing a configuration of the separator material 10 after the first press working step. FIG. 3 shows an XYZ three-dimensional orthogonal coordinate system for the descriptions. The separator material 10 has a rectangular shape in the XY plan view. The longitudinal direction of the rectangular separator material 10 is defined as an X direction, and the transverse direction is defined as a Y direction. The longitudinal direction (the X direction) is a direction in which cooling water and a fuel gas flow. A thickness direction (a height direction) of the separator material 10 is defined as a Z direction. Further, a +Z side will be described as an upper side, and a −Z side will be described as a lower side. The length of the separator material 10 in the transverse direction is about 100 mm to 150 mm, and the length of the separator material 10 in the longitudinal direction is about 200 mm to 250 mm.

The separator material 10 includes a flow path forming region 11 and manifold parts 16. The flow path forming region 11 is disposed at the center of the separator material 10 in the X direction. By going through the press working step of the manufacturing method according to this embodiment, a recessed and projected shape, which will become flow paths of the cooling water and the fuel gas, is formed in the flow path forming region 11.

The recessed and projected shape is inverted on a front surface and a rear surface of the separator material 10. Thus, the flow paths are formed on both the front surface and the rear surface of the separator material 10. Specifically, the recesses of the recessed and projected shape become flow path grooves where the cooling water and the fuel gas flow. A plurality of flow path grooves are formed in the flow path forming region 11. Each of the flow path grooves extends in the X direction. The plurality of flow path grooves are disposed side by side in the Y direction in the flow path forming region 11.

The manifold parts 16 are disposed on both sides of the flow path forming region 11 in the X direction. That is, the manifold parts 16 are disposed at both ends of the separator material 10 in the X direction. The manifold parts 16 form inlet and outlet ports for the fuel gas and cooling water.

The manifold part 16 includes hole forming parts 12. The hole forming part 12 is a part where a through hole is formed during a punching step, which will be described later. In FIG. 3, three hole forming parts 12 are formed in one manifold part 16, but the number of the hole forming parts 12 is not particularly limited.

As shown in FIG. 2, a region corresponding to the flow path forming region 11 of the first upper die 51 and the first lower die 50 is defined as a first processing region 53, and regions corresponding to the hole forming parts 12 are defined as second processing regions 54. Projections and recesses 55 are formed in the first processing region 53. Projections and recesses 56 are formed in the second processing regions 54. The first lower die 50 is integrally formed. The first upper die 51 is integrally formed.

A first recessed and projected shape 13 and second recessed and projected shapes 14 are formed on the separator material 10 sandwiched between the first upper die 51 and the first lower die 50 (S12). That is, the separator material 10 is sandwiched between the first upper die 51 and the first lower die 50, and then the dies are pressurized by a press machine including a pressurizing cylinder and the like. Then, the first recessed and projected shape 13 is formed in the flow path forming region 11 of the separator material 10, and the second recessed and projected shapes 14 are formed in the hole forming parts 12. The first recessed and projected shape 13 is formed by the recesses and projections 55 in the first processing region 53, and the second recessed and projected shapes 14 are formed by the recesses and projections 56 in the second processing regions 54. Recess and projection height of the projection and recesses 55 in the first processing region 53 is lower than a recess and projection height of the projection and recesses 56. Further, in the first lower die 50 and the first upper die 51, areas other than the first processing region 53 and the second processing regions 54 are flat.

FIG. 3 schematically shows a cross-sectional view of the separator material 10 taken along the line A-A. The cross-sectional view taken along the line A-A schematically shows a cross sectional shape of the second recessed and projected shape 14. In the second recessed and projected shape 14, recesses and the projection are alternately arranged.

Figure 4:
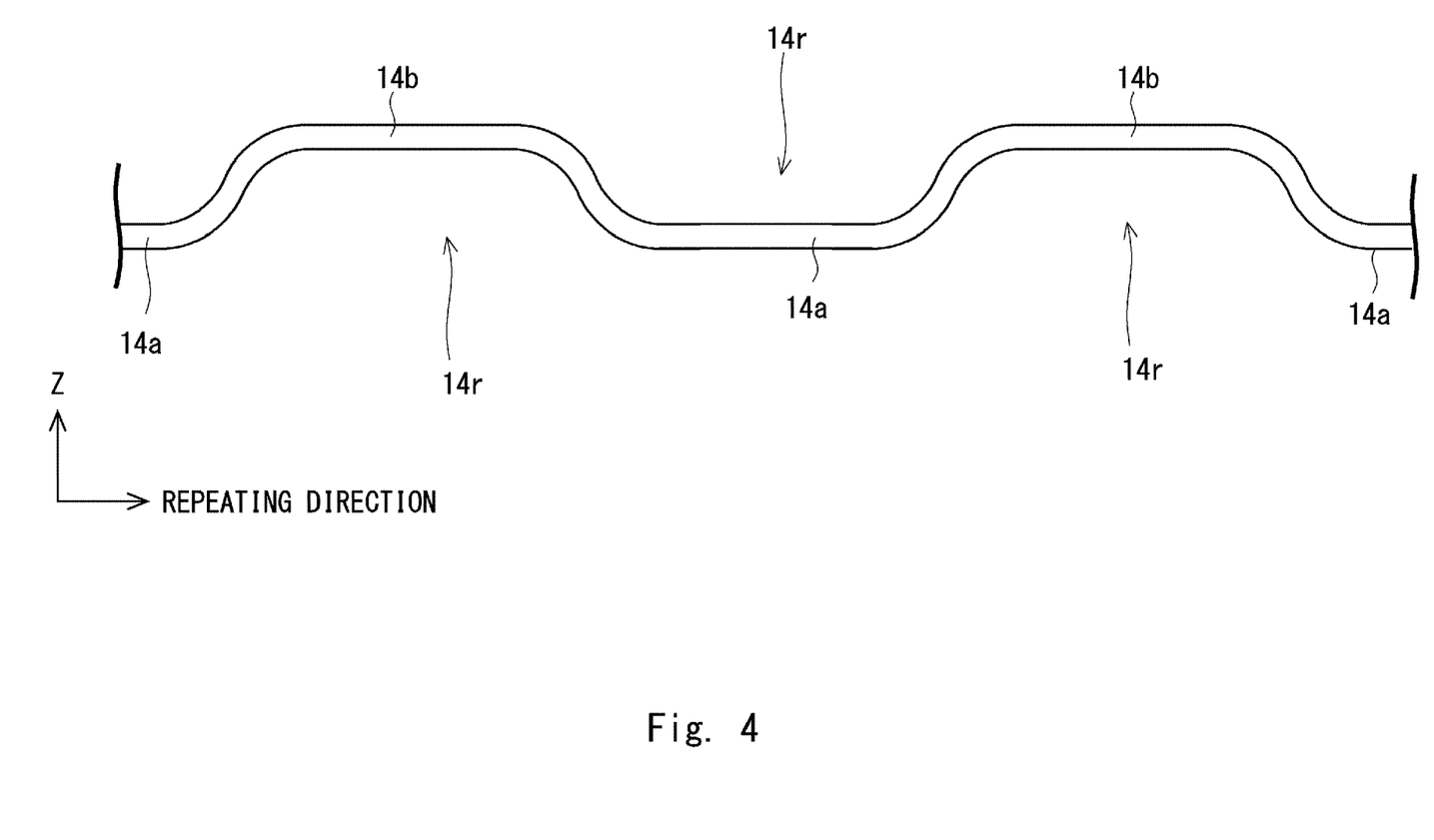
FIG. 4 is an enlarged cross-sectional view showing a configuration of a second recessed and projected shape.

FIG. 4 shows an example of a detailed shape of the second recessed and projected shape 14. The second recessed and projected shape 14 includes a plurality of projections 14b and a plurality of recesses 14a. In the lateral direction in the plane of the drawing of FIG. 4, the second recessed and projected shape 14 has a configuration in which the projections 14b and the recesses 14a are alternately repeated.

The direction in which the projections 14b and the recesses 14a are repeated is defined as a repeating direction. The cross-sectional view taken along the line A-A of FIG. 3 and the cross-sectional view of FIG. 4 are taken along the repeating direction. The repeating direction is a direction inclined from the X direction and the Y direction. Specifically, the repeating direction is inclined from the X direction by 45°. The upper side of the recess 14a and the lower side of the projection 14b serve as grooves 14r. A plurality of parallel grooves 14r are orthogonal to the repeating direction and extend along a direction orthogonal to the Z direction. That is, the grooves 14r extend in a direction orthogonal to the plane of the drawing.

The second recessed and projected shapes 14 formed outside the flow path forming region 11 in this manner enable the separator material 10 to lock inside the die during press working. This effectively prevents the separator material 10 from being drawn in and warpage from occurring in the separator material 10.

Specifically, when boundary parts (junction parts) are formed between the flow path forming region 11 and the manifold parts 16, the material is drawn in the direction of the arrow A1 in FIG. 3. The arrow A1 indicates a direction parallel to the repeating direction of the recesses 14a and the projections 14b of the second recessed and projected shapes 14 and is a direction inclined from the longitudinal direction (the X direction) of the separator material 10.

The second recessed and projected shapes 14 formed in the manifold parts 16 can reduce distortion at the boundary parts between the flow path forming region 11 and the manifold parts 16 in the longitudinal direction. This effectively prevents warpage from occurring in the separator material 10. As described above, the recesses 14a and the projections 14b are repeated in a direction inclined from the X direction. Note that the repeating direction may be a diagonal direction of the rectangular separator material 10.

It is preferable that, before the flow path forming region 11 is processed, the recess and projection height of the second recessed and projected shape 14 be made higher than the recess and projection height of the first recessed and projected shape 13 in order to lock the separator material 10. That is, processing on the first recessed and projected shape 13 by the recesses and projections 55 is started after processing on the second recessed and projected shapes 14 by the recesses and projections 56 is started. By doing so, after the separator material 10 is locked by the first lower die 50 and the first upper die 51 in the second processing regions 54, the first lower die 50 and the first upper die 51 deform the separator material 10 in the first processing region 53. The dies can lock the separator material 10 in the manifold parts 16 and effectively prevent the separator material 10 from being drawn in.

Figure 5:
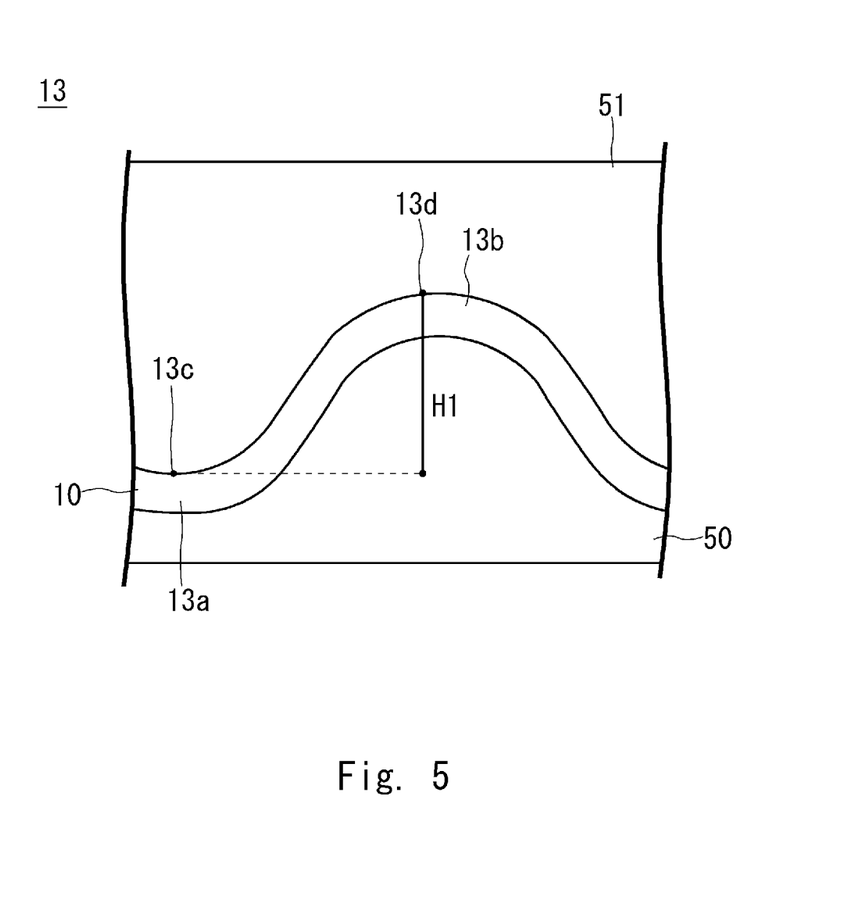
FIG. 5 is an enlarged cross-sectional view showing a first recessed and projected shape.
Figure 6:
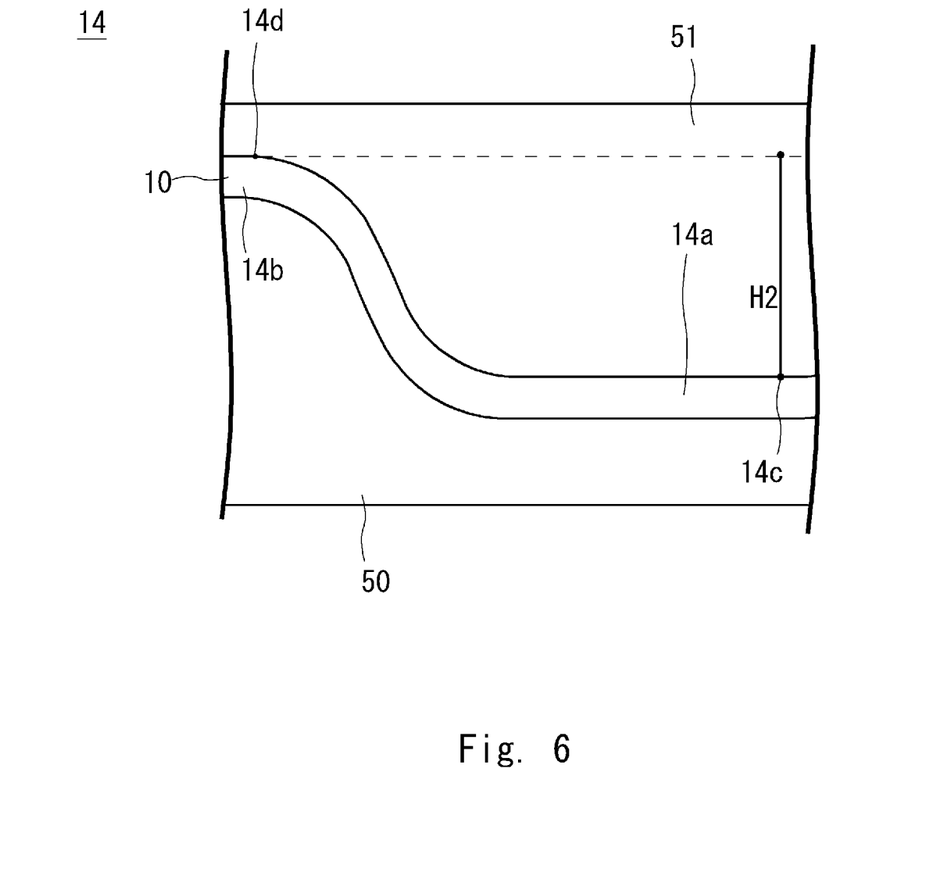
FIG. 6 is an enlarged cross-sectional view showing a second recessed and projected shape.

The first recessed and projected shape 13 and the second recessed and projected shape 14 will be described in detail with reference to FIGS. 5 and 6. FIGS. 5 and 6 are enlarged cross-sectional views showing a state where the separator material 10 is sandwiched between the first upper die 51 and the first lower die 50. FIG. 5 shows a cross section of the first processing region 53, i.e., a cross section at a position where the first recessed and projected shape 13 is formed. FIG. 6 shows a cross section of the second processing region 54, i.e., a cross section at a position where the second recessed and projected shape 14 is formed.

As shown in FIG. 5, the first recessed and projected shape 13 includes recesses 13a and projections 13b. The lowest position of the recess 13a is defined as a bottom part 13c, and the highest position of the projection 13b is defined as a top part 13d. The recess and projection height of the first recessed and projected shape 13 is H1. The recess and projection height H1 is a distance from the bottom part 13c to the top part 13d in the Z direction on one surface of the first recessed and projected shape 13. Thus, the recess and projection height H1 is equal to the recess and projection height of the first upper die 51 in the first processing region 53. In other words, the recess and projection height H1 is equal to the recess and projection height of the first lower die 50 in the first processing region 53. The recess and projection height H1 is, for example, about 0.4 mm to 0.5 mm.

As shown in FIG. 6, the second recessed and projected shape 14 includes recesses 14a and projections 14b. Like the first recessed and projected shape 13, the lowest position of the recesses 14a is defined as a bottom part 14c, and the highest position of the projection 14b is defined as a top part 14d. The recess and projection height of the second recessed and projected shape 14 is H2. The recess and projection height H2 is a distance from the bottom part 14c to the top part 14d in the Z direction on one surface of the second recessed and projected shape 14. Thus, the recess and projection height H2 is equal to the recess and projection height of the surface of the first upper die 51 in the second processing region 54. In other words, the recess and projection height H2 is equal to the recess and projection height of the first lower die 50 in the second processing region 54. The recess and projection height H2 is, for example, about 0.5 mm to 0.6 mm.

It is preferable that the recess and projection height H2 of the second recessed and projected shape 14 be higher than the recess and projection height H1 of the first recessed and projected shape 13. Specifically, the recess and projection height H2 of the second recessed and projected shape 14 is preferably higher than the recess and projection height H1 of the first recessed and projected shape 13 by 0.1 mm or more. In this way, it is possible to reliably lock the separator material 10 inside the dies before the second recessed and projected shapes 14 are formed in the flow path forming region 11.

Returning to the description of FIG. 1, the first press working is completed (S13). That is, the dies are opened, and the separator material 10 having the first recessed and projected shape 13 and the second recessed and projected shapes 14 is removed from the dies. Next, the second press working is started (S21). Here, as shown in FIG. 7, the separator material 10 on which the first recessed and projected shape 13 and the second recessed and projected shapes 14 are formed (not shown in FIG. 7) is disposed between a second lower die 60 and a second upper die 61.

Figure 7:
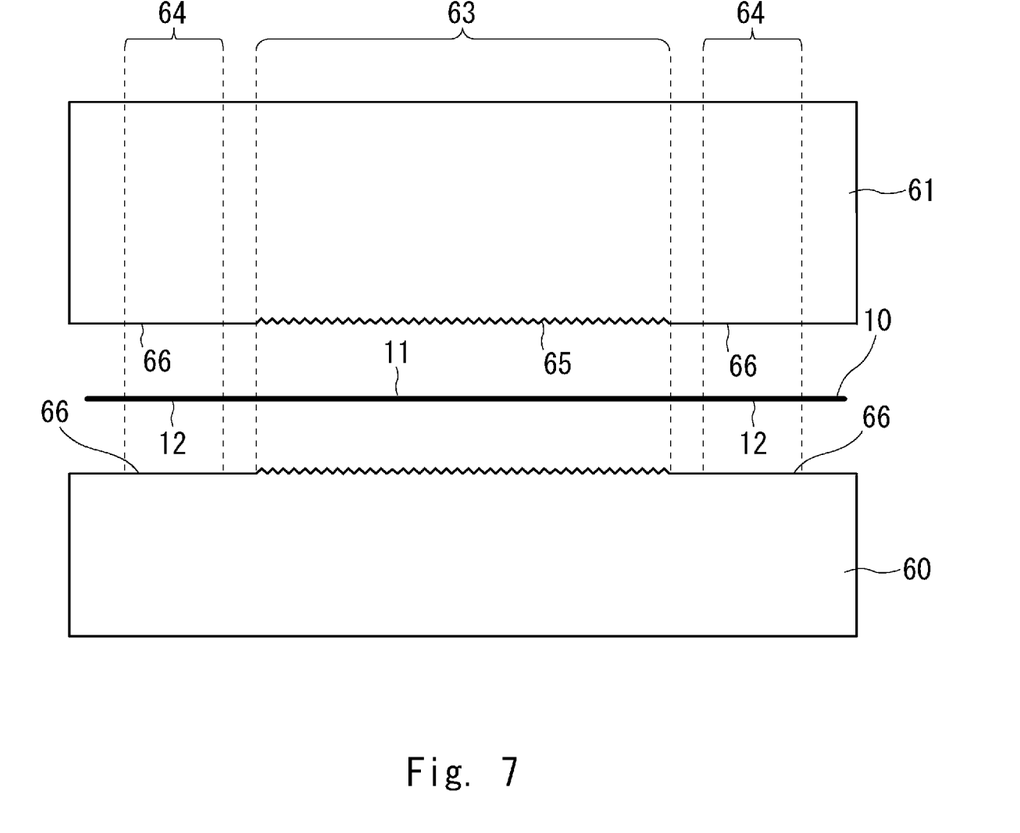
FIG. 7 is a cross-sectional view for describing a second press working step.

As shown in FIG. 7, a region of the second upper die 61 and the second lower die 60 corresponding to the flow path forming region 11 is defined as a first processing region 63, and regions of the second upper die 61 and the second lower die 60 corresponding to the hole forming parts 12 are defined as second processing regions 64. Projections and recesses 65 are formed in the first processing region 63. Flat surfaces 66 are formed in the second processing regions 64. The second lower die 60 is integrally formed. The second upper die 61 is integrally formed.

Then, the separator material 10 is pressed to crush the second recessed and projected shapes 14 using the second upper die 61 and the second lower die 60 (S22). That is, the separator material 10 is sandwiched between the second upper die 61 and the second lower die 60, and then the dies are pressurized by a press machine including a pressurizing cylinder and the like.

Figure 8:
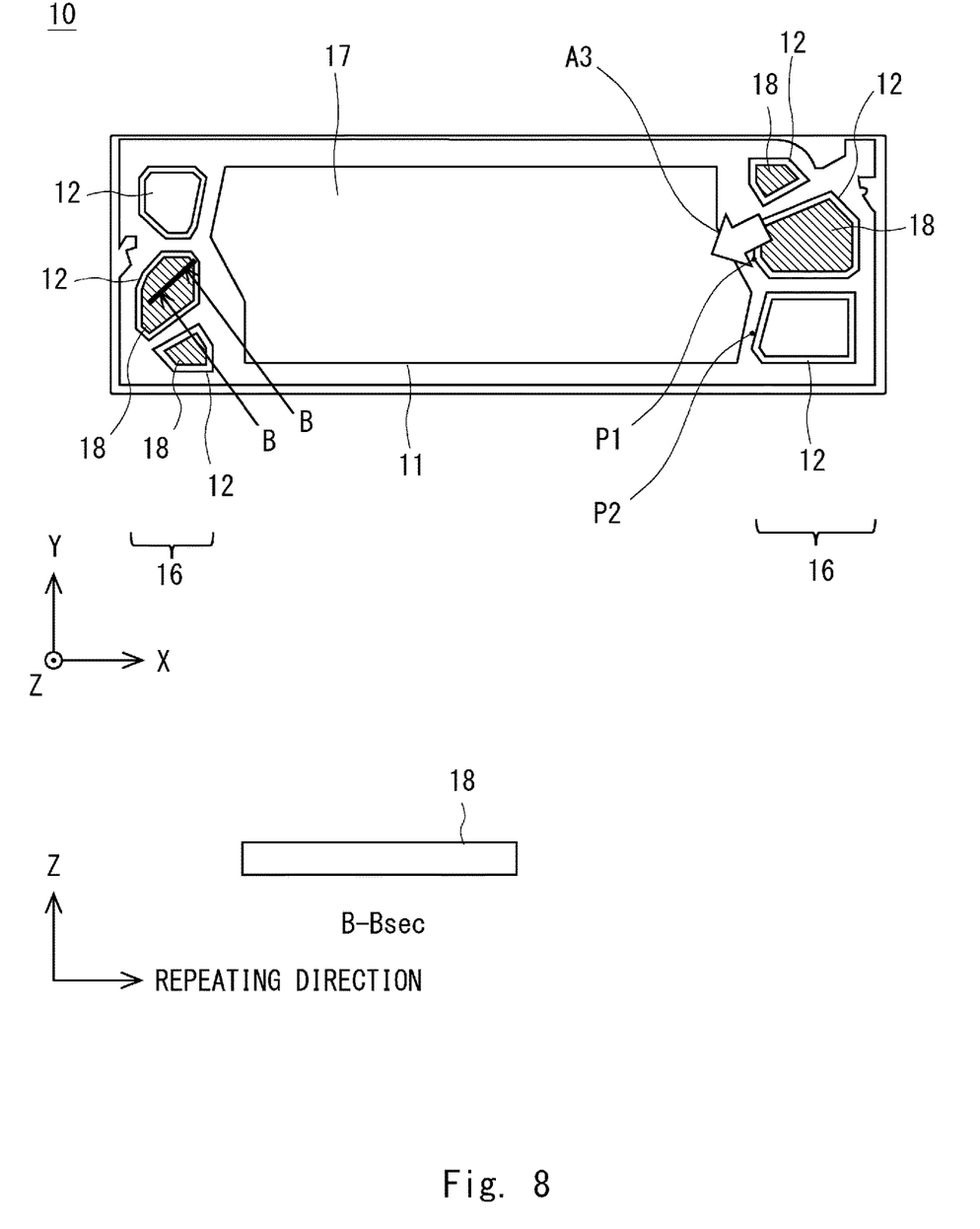
FIG. 8 is a view showing a configuration of a separator material in the second press working step.

The flat surfaces 66 are formed in the second processing regions 64 of the second upper die 61 and the second lower die 60. Thus, as shown in FIG. 8, the hole forming parts 12 become flat parts 18. When the second recessed and projected shapes 14 are crushed, the separator material 10 is drawn in the direction of the arrow A3 in FIG. 8 at the boundary parts between the flow path forming region 11 and the manifold parts 16. Thus, the material is sent out to the flow path forming region 11, and the tensile strain (indicated by the arrow A2 in FIG. 3) generated in S12 can be reduced.

Further, in S22, a flow path 17 is formed in the flow path forming region 11. The recess and projection height of the flow path 17 is less than that of the first recessed and projected shape 13 formed in the first press working step. For example, the flow path 17 has a recess and projection height of about 0.3 mm to 0.4 mm. After S22, the recess and projection height of the flow path 17 is larger than the recess and projection height of the hole forming part 12.

The second press working is completed (S23). That is, the dies are opened, and the separator material 10 including the flow path 17 and the flat parts 18 is removed from the dies.

In the second press working step, the separator material 10 is crushed so that the hole forming parts 12 become the flat parts 18. Specifically, dimensions of the dies are determined in such a way that, at the time of pressurization, a gap between the second lower die 60 and the second upper die 61 in the second processing regions 64 becomes an upper limit of the plate thickness of the separator material 10. Thus, the recess and projection height of the hole forming part 12 is zero. In S22, the hole forming parts 12 do not have to be completely flat. That is, the recess and projection height of the hole forming parts 12 after S22 only needs to be smaller than the recess and projection height of the second recessed and projected shape 14 formed in the first press working step.

Figure 9:
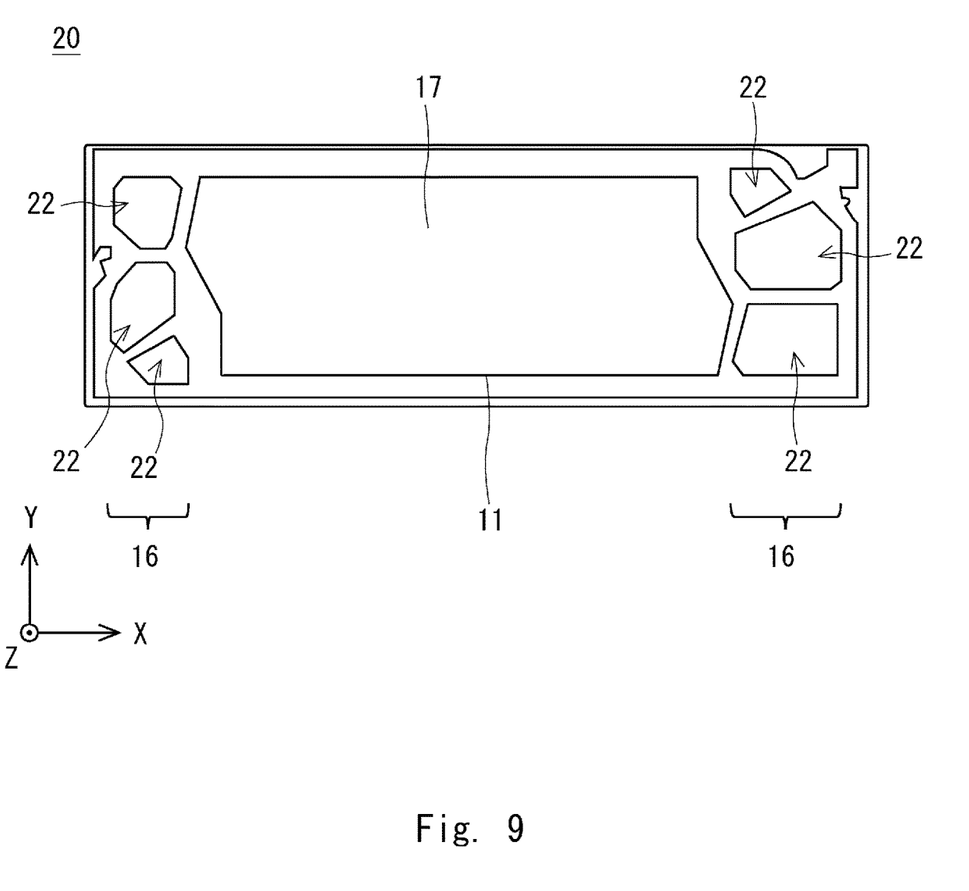
FIG. 9 is a view showing a configuration of a separator material in a punching step.

Then, the hole forming parts 12 are punched out (S31). Then, as shown in FIG. 9, through holes 22 are formed at parts used to be the hole forming parts 12, and the separator 20 is completed. Regions where the second recessed and projected shapes 14 are formed are punched out. The through holes 22 are formed in the manifold parts 16 in order to supply or discharge the fuel gas and the cooling water. That is, the fuel gas and the cooling water supplied from the through holes 22 on one end side of the separator 20 in the X direction are discharged from the through holes 22 on the other end side of the separator 20 through the flow path 17.

Figure 10:
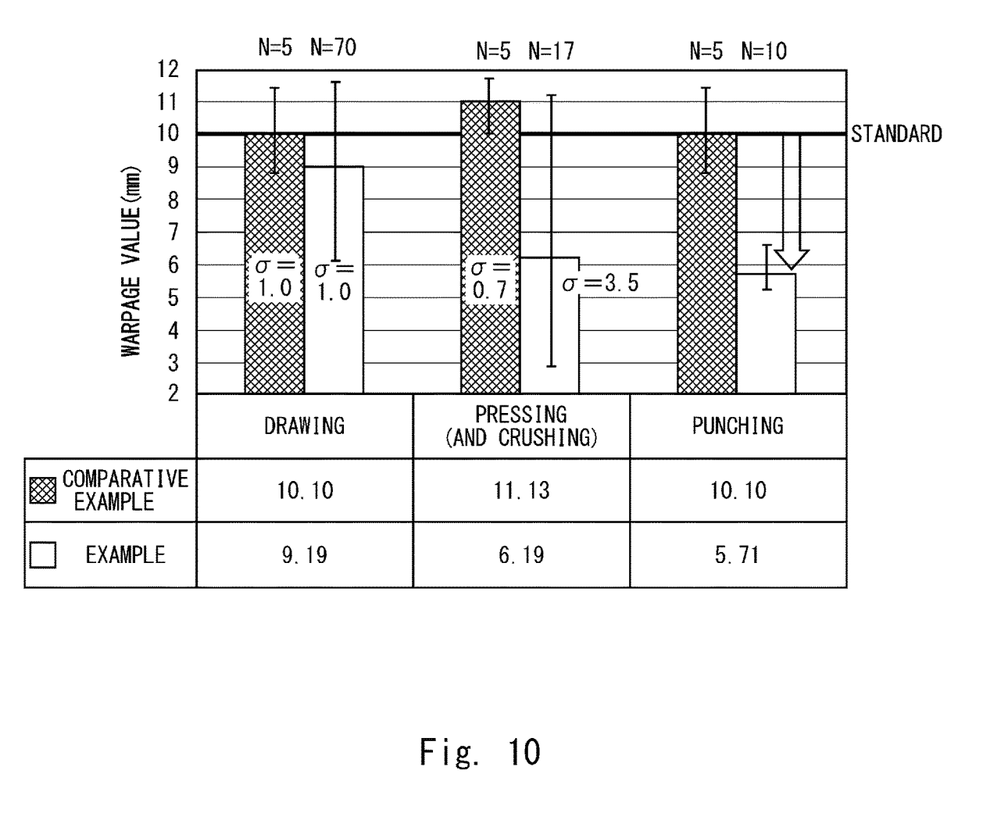
FIG. 10 is a view showing measurement results of warpage values.

FIG. 10 shows measurement results of amounts of warpage in the separator material according to Example and amounts of warpage in the separator material according to Comparative Example. In the manufacturing method according to Example, the second recessed and projected shapes 14 were formed in the hole forming parts 12 in the first press working step, whereas in the manufacturing method according to Comparative Example, the second recessed and projected shape 14 was not formed in the hole forming parts 12 in the first press working step. FIG. 10 shows the amounts of warpage (warpage values) measured in each of the first press working step (the drawing step), the second press working step (the crushing step), and the punching step. Average warpage values of N samples are shown for both Example and Comparative Example.

As shown in FIG. 10, in each step, the average warpage value in Example is smaller than the average warpage value in Comparative Example. Furthermore, the warpage value and variation in the warpage values become small as the process proceeds to the second pressing step and the punching step. In this manner, the separator 20 having a standard value (10 mm) or less can be manufactured with high productivity.

In the first press working step, the second recessed and projected shapes 14 are formed in the manifold parts 16 outside the flow path forming region 11. By doing so, it is possible to effectively prevent warpage from occurring in the separator material 10. It is also possible to effectively prevent distortion from occurring in the separator 20. Further, it is possible to effectively prevent, for example, an excess material from being generated when the separator 20 is bonded, an assembly failure during stacking of a separator, and a failure in workpiece transportation. Thus, the productivity of the separator material 10 and the fuel cell can be improved.

The second recessed and projected shapes 14 are formed in the hole forming parts 12 where the through holes 22 are formed in the punching step. That is, parts where the second recessed and projected shapes 14 are formed are punched out. It is possible to effectively prevent warpage without changing a final product shape of the separator 20. The press working can be carried out on the separator material 10 without adding a space only for forming the second recessed and projected shape 14. This enhances the space efficiency.

Further, the second recessed and projected shapes 14 are crushed in the second press working step between the first press working step and the punching step. By doing so, it is possible to reduce a sharp difference in sectional forces exerted at boundaries between the manifold parts 16 and the flow path forming region 11 in the second press working step. For example, as a result of analyzing the pressurized structure in Comparative Example and Example, it has been found that in Example, a difference between a sectional force of a point P1 and that of a point P2 (see FIG. 8) is 2N, while in Comparative Example, a difference between a sectional force of the point P1 and that of the point P2 is 5N. As described above, a sharp difference in a sectional force caused by the press working can be reduced in this example.

In Comparative Example, distortion in the longitudinal direction (the X direction) increases at the boundary parts between the flow path forming region 11 and the manifold parts 16. This distortion causes the amount of warpage at the end part of the separator material 10 to become large. As in this embodiment, when the second recessed and projected shapes 14 are crushed to make them flat in the second press working step, the sharp difference in the sectional forces can be reduced, and thus the warpage can be effectively prevented.

Each of the first lower die 50, the first upper die 51, the second lower die 60, and the second upper die 61 is integrally formed. For example, the first processing region 53 and the second processing regions 54 are provided in the integrally-formed first upper die 51. Likewise, the first processing region 53 and the second processing regions 54 are provided in the integrally-formed first lower die 50. Therefore, it is possible to effectively prevent an increase in additional equipment such as an actuator, thereby improving productivity.

On the other hand, in Japanese Unexamined Patent Application Publication No. 2012-99371, the lower die and the upper die are each divided into an intermediate part forming die and an outer peripheral part holding die. Thus, pressurizing equipment such as a hydraulic cylinder is required for each of the intermediate part molding die and the outer peripheral part holding die. When each of the upper die and the lower die is divided, the dies wear at sliding parts, which requires maintenance. For this reason, the productivity decreases in the method of Japanese Unexamined Patent Application Publication No. 2012-99371.

Note that the present disclosure is not limited to the above-described embodiments, and can be appropriately changed without departing from the spirit of the present disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method for manufacturing a separator, the method comprising:
    a step of disposing the separator including a flow path forming region between a first upper die and a first lower die;
    a first pressing step of pressing the separator using the first upper die and the first lower die to thereby form a first recessed and projected shape in the flow path forming region and form a second recessed and projected shape outside the flow path forming region;
    a step of disposing, after the first pressing step, the separator on which the first recessed and projected shape and the second recessed and projected shape are formed between a second upper die and a second lower die; and
    a second pressing step of pressing the separator using the second upper die and the second lower die to thereby crush the second recessed and projected shape,
    wherein, in the first pressing step, the second recessed and projected shape is formed outside the flow path forming region so that a recessed and projected height of the second recessed and projected shape is higher than a recessed and projected height of the first recessed and projected shape to thereby prevent the separator from being drawn in.

2. The method according to claim 1, further comprising a step of punching out a region where the second recessed and projected shape is formed, wherein
    the second recessed and projected shape is formed in a manifold part of the separator.

3. The method according to claim 1, wherein recesses and projections of the second recessed and projected shape are repeated along a direction inclined from a longitudinal direction of the separator in a plan view.

4. The method according to claim 1,
    wherein the flow path forming region includes a flow path, and
    wherein in the pressing of the second pressing step, the flow path is formed by lowering the recessed and projected height of the first recessed and projected shape.

5. The method according to claim 1, wherein the first pressing step is a drawing step.

\* \* \* \* \*